(12) United States Patent
Matsuyama et al.

(10) Patent No.: US 10,539,741 B2
(45) Date of Patent: Jan. 21, 2020

(54) OPTICAL DEVICE WITH OPTICAL FILTERS AND PROCESSING METHOD OF OPTICAL SIGNALS

(71) Applicant: NEC Corporation, Tokyo (JP)

(72) Inventors: Yurie Matsuyama, Tokyo (JP); Takefumi Oguma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/078,980

(22) PCT Filed: Feb. 21, 2017

(86) PCT No.: PCT/JP2017/006394
§ 371 (c)(1),
(2) Date: Aug. 22, 2018

(87) PCT Pub. No.: WO2017/150278
PCT Pub. Date: Sep. 8, 2017

(65) Prior Publication Data
US 2019/0064437 A1 Feb. 28, 2019

(30) Foreign Application Priority Data
Feb. 29, 2016 (JP) ................................. 2016-038163

(51) Int. Cl.
*G02B 6/12* (2006.01)
*G02B 5/18* (2006.01)
(Continued)

(52) U.S. Cl.
CPC ....... *G02B 6/12009* (2013.01); *G02B 5/1866* (2013.01); *G02B 6/29389* (2013.01);
(Continued)

(58) Field of Classification Search
CPC .. G02B 6/12; G02B 6/12009; G02B 6/29389; G02F 1/31; H04B 10/60; H04J 14/02
(Continued)

(56) References Cited

U.S. PATENT DOCUMENTS 6,023,366 A * 2/2000 Kinoshita ........... H04J 14/0246
359/337.12
7,796,887 B2 * 9/2010 Terahara ................. H04J 14/02
398/26
(Continued)

FOREIGN PATENT DOCUMENTS

EP 0 936 483 A2 8/1999
JP 2000-244402 A 9/2000
(Continued)

OTHER PUBLICATIONS

International Search Report dated May 23, 2017, in corresponding PCT International Application.
(Continued)

*Primary Examiner* — Akm E Ullah
(74) *Attorney, Agent, or Firm* — Finnegan, Henderson, Farabow, Garrett & Dunner, L.L.P.

(57) ABSTRACT

[Problem] To provide an optical device capable of suppressing an optical signal from being trimmed because of band narrowing due to optical filters.
[Solution] An optical device according to the present invention is provided with a plurality of optical filters each of which filters an optical signal in a predetermined band out of a plurality of optical signals with wavelengths different from one another. The plurality of optical filters are configured in such a way that portions of the pass bands (13_1, 13_2, 13_3) of respective optical filters that respectively pass optical signals (15_1, 15_2, 15_3) with wavelengths adjacent to each other overlap each other.

16 Claims, 9 Drawing Sheets

(51) Int. Cl.
*G02F 1/31* (2006.01)
*H04B 10/60* (2013.01)
*H04J 14/02* (2006.01)
*G02B 6/293* (2006.01)

(52) U.S. Cl.
CPC ............... *G02F 1/31* (2013.01); *H04B 10/60* (2013.01); *H04J 14/02* (2013.01)

(58) Field of Classification Search
USPC .......................................................... 385/37
See application file for complete search history.

(56) References Cited

U.S. PATENT DOCUMENTS

| | | | |
|---|---|---|---|
| 2003/0002798 A1* | 1/2003 | Hatayama .......... | G02B 6/12004 385/48 |
| 2003/0016911 A1* | 1/2003 | Talebpour .......... | G02B 6/02085 385/37 |
| 2003/0215233 A1* | 11/2003 | Tomofuji ............ | H04J 14/0209 398/41 |
| 2011/0311222 A1* | 12/2011 | Nakamura ....... | H04B 10/07953 398/26 |
| 2014/0140692 A1* | 5/2014 | Oda ................... | H04B 10/5057 398/23 |
| 2014/0268155 A1 | 9/2014 | Black et al. | |

FOREIGN PATENT DOCUMENTS

| | | |
|---|---|---|
| JP | 2004-40253 A | 2/2004 |
| JP | 2012-175247 A | 9/2012 |
| JP | 2015-19289 A | 1/2015 |
| JP | 2015-60125 A | 3/2015 |
| WO | WO 2013/072702 A1 | 5/2013 |

OTHER PUBLICATIONS

Klonidis, D. et al., "Enabling Transparent Technologies for the Development of Highly Granular Flexible Optical Cross-Connects", 16th International Conference on Transparent Optical Networks, Jul. 9, 2014, We.D1.5, pp. 1-6 (2014).

Jinno, M. et al., "Demonstration of Novel Spectrum-Efficient Elastic Optical Path Network with Per-Channel Variable Capacity of 40 Gb/s to Over 400 Gb/s", 34th European Conference on Optical Communication, Sep. 24, 2008, Th.3.F.6, pp. 1-2 (2008).

Zami, T., "Impact of intra-superchannel spectral constraints on the throughput of the elastic WDM networks", OFC/NFOEC Technical Digest, May 3, 2012, pp. 1-3 (2012).

Sayyad Khodashenas Pouria et al: "Investigation of Spectrum Granularity for Performance Optimization of Flexible Nyquist-WDM-Based Optical Networks", Journal of Lightwave Technology, IEEE, USA, vol. 33, No. 23, Dec. 1, 2015, pp. 4767-4774.

Extended European Search Report dated Sep. 30, 2019, by the European Patent Office in counterpart European Patent Application No. 17759744.0.

* cited by examiner

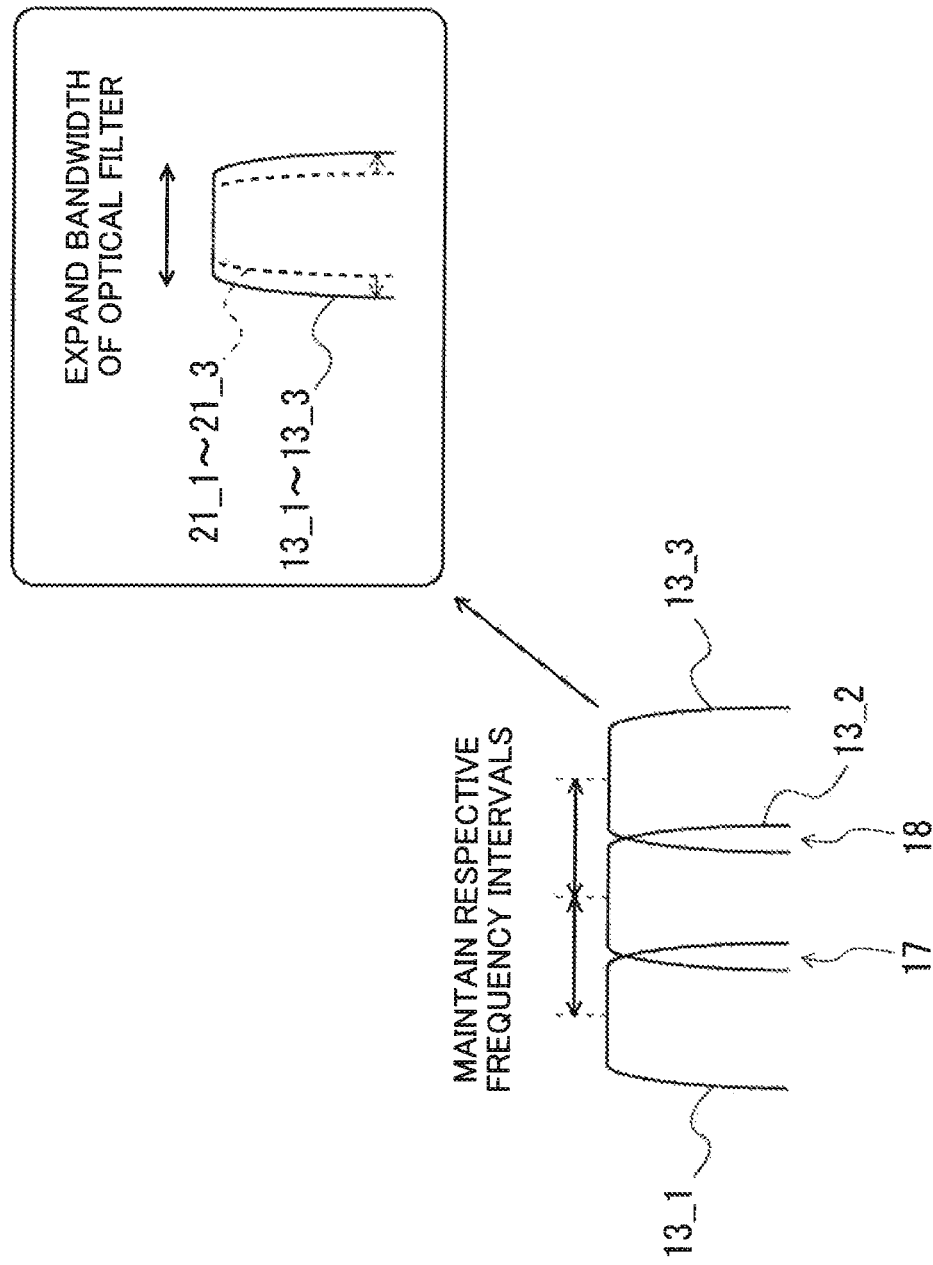

Fig. 7
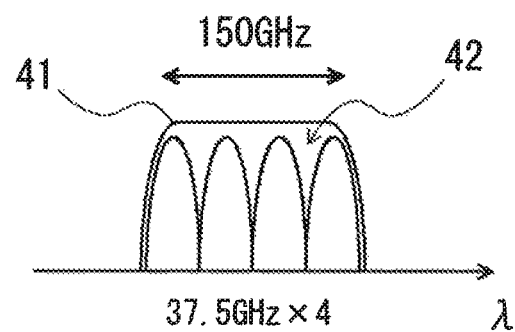
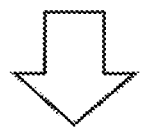
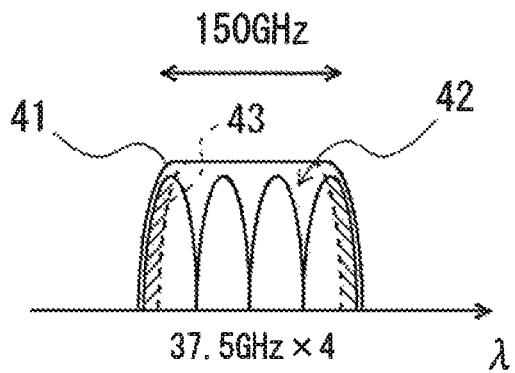

OPTICAL DEVICE WITH OPTICAL FILTERS AND PROCESSING METHOD OF OPTICAL SIGNALS

CROSS-REFERENCE TO RELATED PATENT APPLICATIONS

This application is a National Stage Entry of International Application No. PCT/JP2017/006394, filed Feb. 21, 2017, which claims priority from Japanese Patent Application No. JP 2016-038163, filed Feb. 29, 2016. The entire contents of the above-referenced applications are expressly incorporated herein by reference.

TECHNICAL FIELD

The present invention relates to an optical device, and particularly relates to an optical device used in an optical communication network.

BACKGROUND ART

In association with an increase in demand for a wideband multimedia communication service, such as the Internet and image distribution, introduction of an optical fiber communication system that covers a long distance and that has a large capacity has been progressing in trunk line networks and metro access networks.

In such an optical communication system using optical fibers, it is important to increase transmission efficiency per optical fiber. For this reason, wavelength division multiplex (WDM) communication, in which a plurality of optical signals having different wavelengths are multiplexed and transmitted, are widely used.

PTL 1 discloses an optical transmission device that includes an optical filter that passes an optical signal in a predetermined band. The optical transmission device is used in an optical network that uses a WDM technology.

CITATION LIST

Patent Literature

[PTL 1] JP 2015-19289 A

SUMMARY OF INVENTION

Technical Problem

As described in the background art, a system that is capable of performing long distance transmission is required in optical communication networks. However, when optical transmission devices using optical filters filtering optical signals (see PTL 1) are used in an optical communication network, an optical signal passes the optical filters many times in a transmission process of the optical signal. There is a problem in that, when an optical signal passes optical filters many times, influence of band narrowing on the optical signal increases and transmission characteristics deteriorate.

In consideration of the above-described problem, an object of the present invention is to provide an optical device capable of suppressing an optical signal from being trimmed because of band narrowing due to optical filters.

Solution to Problem

An optical device according to the present invention includes a plurality of optical filters each of which filters an optical signal in a predetermined band out of a plurality of optical signals with wavelengths different from one another. The plurality of optical filters are configured in such a way that portions of the pass bands of respective optical filters that respectively pass optical signals with wavelengths adjacent to each other overlap each other.

Advantageous Effects of Invention

The present invention enables an optical device capable of suppressing an optical signal from being trimmed because of band narrowing due to optical filters to be provided.

BRIEF DESCRIPTION OF DRAWINGS

FIG. 4A is a diagram for a description of pass bands of the optical filters that the optical device according to the first example embodiment includes;

FIG. 7 is a diagram for a description of a problem in the second example embodiment.

EXAMPLE EMBODIMENT

First Example Embodiment

Hereinafter, an example embodiment of the present invention will be described with reference to the drawings.

Figure 1:
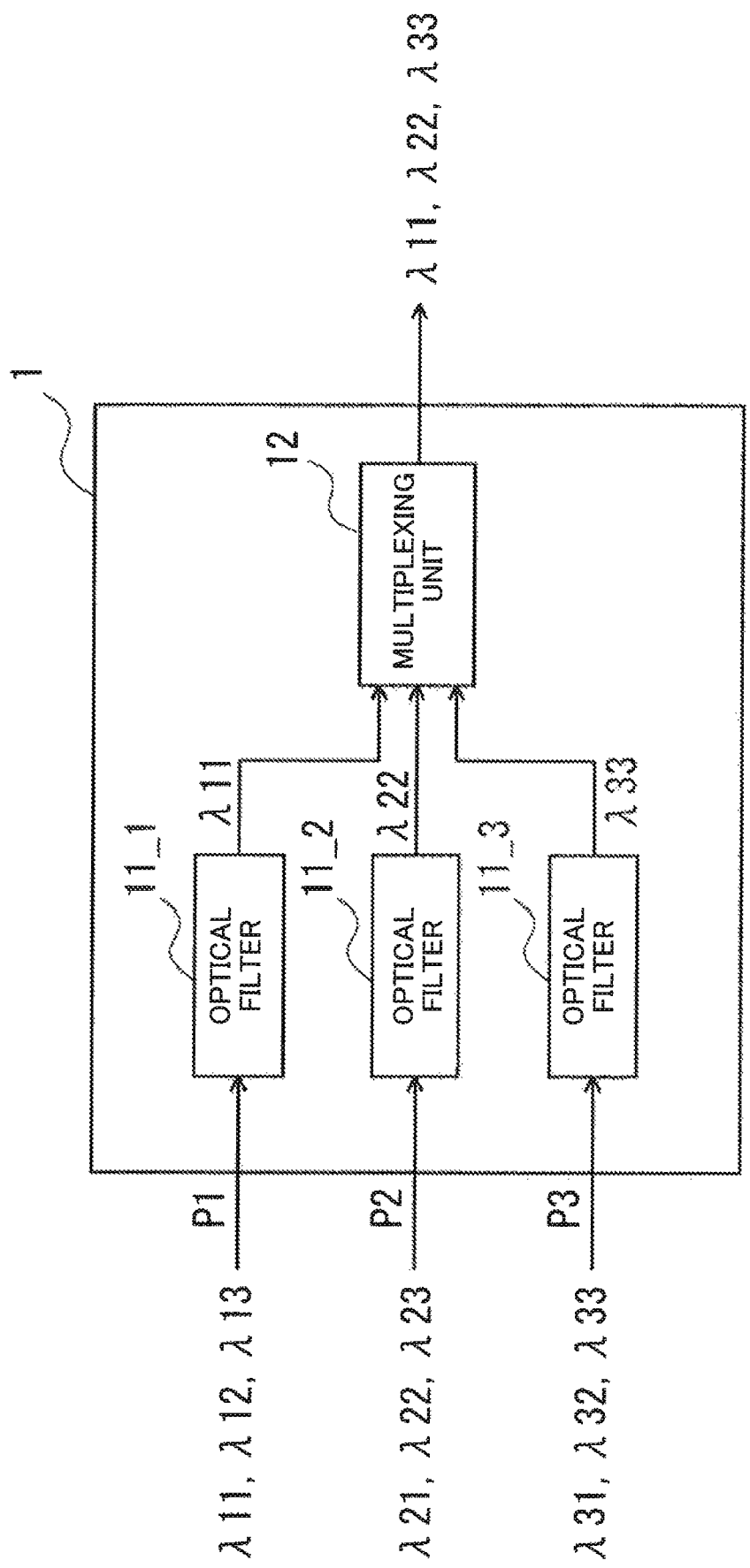
FIG. 1 is a diagram for a description of an optical device according to a first example embodiment.

FIG. 1 is a diagram for a description of an optical device according to a first example embodiment. As illustrated in FIG. 1, an optical device 1 according to the present example embodiment includes a plurality of optical filters 11_1 to 11_3. Each of the optical filters 11_1 to 11_3 filters an optical signal in a predetermined band out of a plurality of optical signals with wavelengths different from one another. Optical signals that passed the respective optical filters 11_1 to 11_3 are multiplexed by a multiplexing unit 12 and outputted from the optical device 1.

The optical device 1 according to the present example embodiment may be any optical device as long as the optical device is an optical device that includes a plurality of optical filters each of which filters an optical signal in a predetermined band out of a plurality of optical signals with wavelengths different from one another. Such optical devices include, for example, a wavelength selective switch (WSS), an arrayed waveguide grating (AWG), a cyclic AWG, and the like, but not limited thereto. FIG. 1 illustrates a cyclic AWG as an example.

In addition, although FIG. 1 is illustrated in a conceptual manner using a functional block diagram so that a configuration of the present example embodiment can be easily understood, an actual configuration of the optical device is not limited to the illustrated one, and, for example, the functions of the optical filters 11_1 to 11_3 and the function of the multiplexing unit 12 may be integrated.

As illustrated in FIG. 1, optical signals λ11 to λ13, λ21 to λ23, and λ31 to λ33 are inputted to input ports P1, P2, and P3, respectively, of the optical device 1 (hereinafter, also referred to as a cyclic AWG 1). The respective optical signals λ11 to λ13 are optical signals with wavelengths different from one another, the respective optical signals λ21 to λ23 are optical signals with wavelengths different from one another, and the respective optical signals λ31 to λ33 are optical signals with wavelengths different from one another.

Meanwhile, the optical signals λ11, λ21, and λ31, which are inputted to the input ports P1, P2, and P3, respectively, are optical signals with an identical wavelength.

In addition, the optical signals λ12, λ22, and λ32, which are inputted to the input ports P1, P2, and P3, respectively, are optical signals with an identical wavelength. Still in addition, the optical signals λ13, λ23, and λ33, which are inputted to the input ports P1, P2, and P3, respectively, are optical signals with an identical wavelength. For this reason, the respective optical filters 11_1 to 11_3 in the cyclic AWG 1 filter respective optical signals inputted to the input ports P1 to P3 lest optical signals with an identical wavelength are supplied to the multiplexing unit 12.

Specifically, the optical filter 11_1 passes the optical signal λ11 and shuts off the optical signals λ12 and λ13 out of the optical signals λ11 to λ13, inputted to the input port P1. In addition, the optical filter 11_2 passes the optical signal λ22 and shuts off the optical signals λ21 and λ23 out of the optical signals λ21 to λ23, inputted to the input port P2. Still in addition, the optical filter 11_3 passes the optical signal λ33 and shuts off the optical signals λ31 and λ32 out of the optical signals λ31 to λ33, inputted to the input port P3.

The optical signals λ11, λ22, and λ33 that passed the optical filters 11_1, 11_2, and 11_3, respectively, are multiplexed by the multiplexing unit 12 and outputted from an output port of the cyclic AWG 1.

Figure 2:
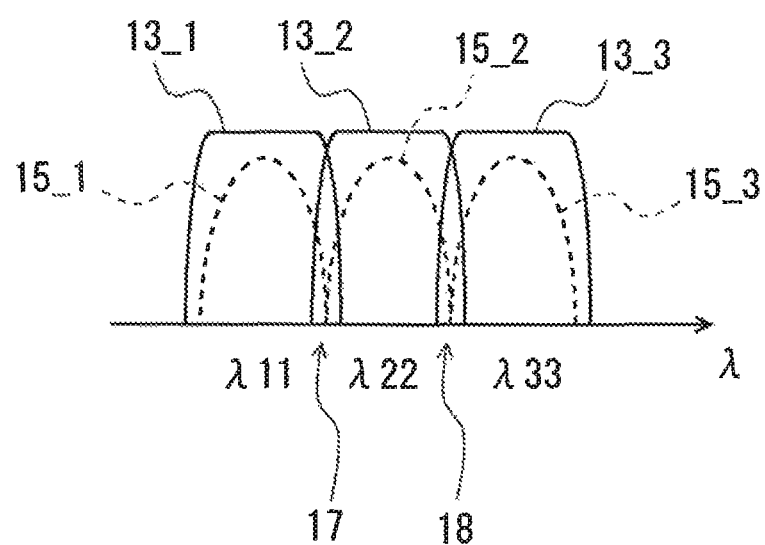
FIG. 2 is a diagram for a description of pass bands of optical filters that the optical device according to the first example embodiment includes.

In the above configuration, the respective optical filters 11_1 to 11_3 are configured in such a way that portions of the pass bands of respective optical filters that respectively pass optical signals with wavelengths adjacent to each other overlap each other. That is, as illustrated in FIG. 2, an optical signal 15_1 (λ11) and an optical signal 15_2 (λ22) are adjacent to each other, and a pass band 13_1 of the optical filter 11_1 and a pass band 13_2 of the optical filter 11_2 are adjacent to each other. The optical filters 11_1 and 11_2 are configured in such a way that a portion of the pass band 13_1 of the optical filter 11_1 and a portion of the pass band 13_2 of the optical filter 11_2 overlap each other (that is, an overlapping area 17 is set). Similarly, the optical signal 15_2 (λ22) and an optical signal 15_3 (λ33) are adjacent to each other, and the pass band 13_2 of the optical filter 11_2 and a pass band 13_3 of the optical filter 11_3 are adjacent to each other. The optical filters 11_2 and 11_3 are configured in such a way that a portion of the pass band 13_2 of the optical filter 11_2 and a portion of the pass band 13_3 of the optical filter 11_3 overlap each other (that is, an overlapping area 18 is set).

When a cyclic AWG is used as the optical device, expanding pass bands corresponding to respective optical filters by, for example, adjusting the shapes of input and output waveguides of the cyclic AWG enables the pass bands to overlap each other between adjacent ports. For example, the pass band of each port of the cyclic AWG can be expanded by adjusting the shapes of a coupling portion between an input waveguide and a slab waveguide on the input side and a coupling portion between a slab waveguide on the output side and an output waveguide of the cyclic AWG.

Figure 3:
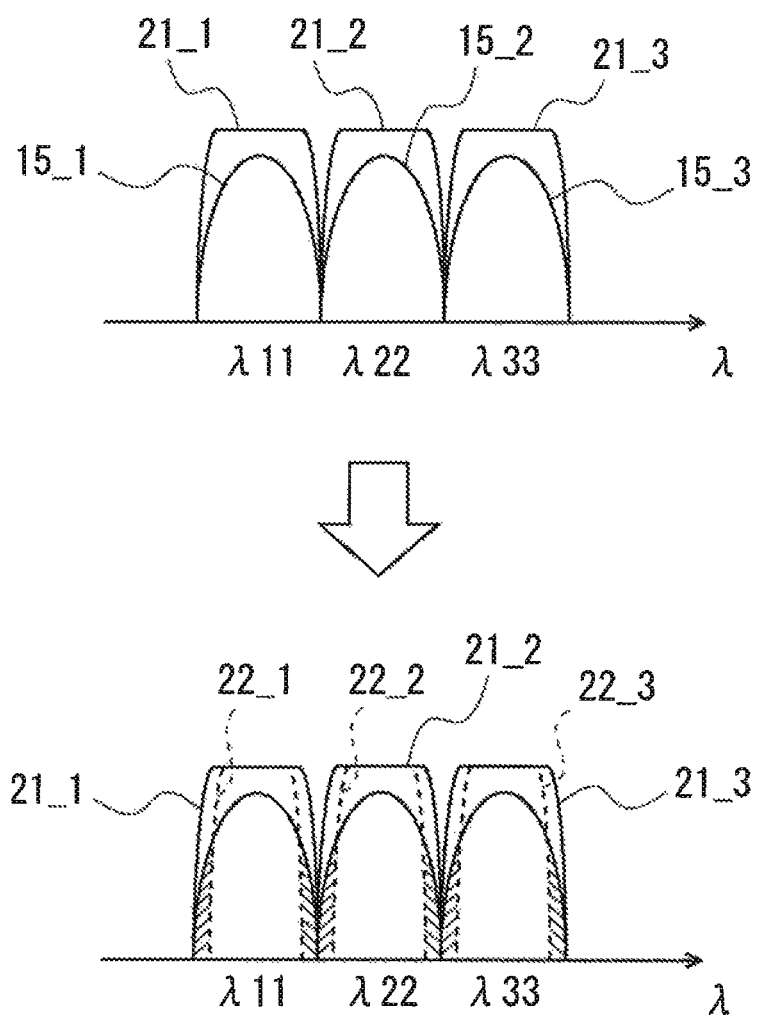
FIG. 3 is a diagram for a description of a problem in the first example embodiment.

As illustrated in the upper drawing in FIG. 3, since the shape of each optical filter is not rectangular and there is individual variation in the center frequency and the bandwidth of each optical filter, the bandwidth of filters viewed at the receiving end becomes narrower (band narrowing) as the number of filters increases. Such a characteristic of filters causes an optical signal to be trimmed at both ends of the frequency band thereof and to lose some signal components therein during a transmission process, and, eventually, signal errors increase at the receiving end, which disables reception of the signal.

Explaining specifically, as illustrated in the lower drawing in FIG. 3, when multiple stages of optical filters are concatenated, the bandwidths of pass bands 21_1 to 21_3 become narrower than the original bandwidths and come to have bandwidths indicated by bandwidths 22_1 to 22_3, respectively. As a result, since each of the optical signals λ11, λ22, and λ33 is trimmed at both ends of the frequency band thereof (portions that are trimmed off are indicated by hatching), the levels of the optical signals λ11, λ22, and λ33 are decreased to a level at which the optical signals cannot be received.

In order to solve such a problem, in the optical device 1 according to the present example embodiment, the respective optical filters 11_1 to 11_3 are configured in such a way that portions of the pass bands of respective optical filters that respectively pass optical signals with wavelengths adjacent to each other overlap each other. That is, as illustrated in FIG. 2, the overlapping area 17 is set where a portion of the pass band 13_1 of the optical filter 11_1 and a portion of the pass band 13_2 of the optical filter 11_2 overlap each other. In addition, the overlapping area 18 is set where a portion of the pass band 13_2 of the optical filter 11_2 and a portion of the pass band 13_3 of the optical filter 11_3 overlap each other. Such a configuration enables each of the optical signals λ11, λ22, and λ33 to be suppressed from being trimmed at both ends of the frequency band thereof because of band narrowing due to optical filters and an optical signal that cannot be received to be suppressed from occurring.

When the overlapping areas 17 and 18 are set among the pass bands of the respective optical filters 11_1 to 11_3, for example, the pass-band width of each of the plurality of optical filters is expanded while frequency intervals between adjacent optical filters are maintained. Explaining specifically, as illustrated in FIG. 4A, while the frequency intervals between adjacent ones of the respective optical filters are maintained, the pass bands of the optical filters are expanded in such a way that the the pass bands 21_1 to 21_3 (see FIG. 3) are expanded to the pass bands 13_1 to 13_3, respectively. The frequency intervals between adjacent ones of the respective optical filters correspond to frequency intervals between the peaks of adjacent ones of the optical signals λ11, λ22, and λ33. Such a configuration enables the overlapping areas 17 and 18 to be set among the pass bands 13_1 to 13_3 of the respective optical filters 11_1 to 11_3.

In addition, the shapes of the pass bands 13_1 to 13_3 of the respective optical filters 11_1 to 11_3 may be set at arbitrary shapes. Taking an example, as the respective optical filters 11_1 to 11_3, super-Gaussian type optical filters may be used.

As another means, for example, adjusting diffraction efficiency of a switching element (liquid crystal on silicon (LCOS)) in a wavelength selective switch WSS enables overlapping areas to be set among pass bands.

In the present example embodiment, use of a switching element 25 configured with an LCOS element in the wavelength selective switches WSS enables pass bands to be adjusted to be expanded.

When a general wavelength selective switch WSS without a configuration having overlapping areas among pass bands is used, the bands of optical signals inputted from a switching element 25 in the wavelength selective switch WSS to respective ports do not overlap each other. Therefore, as illustrated in the left drawing in FIG. 4B, when the switching element 25 switches optical signals λ11, λ22, and λ33 with wavelengths different from one another to be inputted to ports P1, P2, and P3, respectively, the bands of the respective optical signals do not overlap each other. Accordingly, the switching element in the wavelength selective switch WSS performs switching so that the respective optical signals λ11, λ22, and λ33 are inputted to the ports P1, P2, and P3, respectively, in a state where the respective optical signals λ11, λ22, and λ33 do not overlap each other.

Figure 4B:
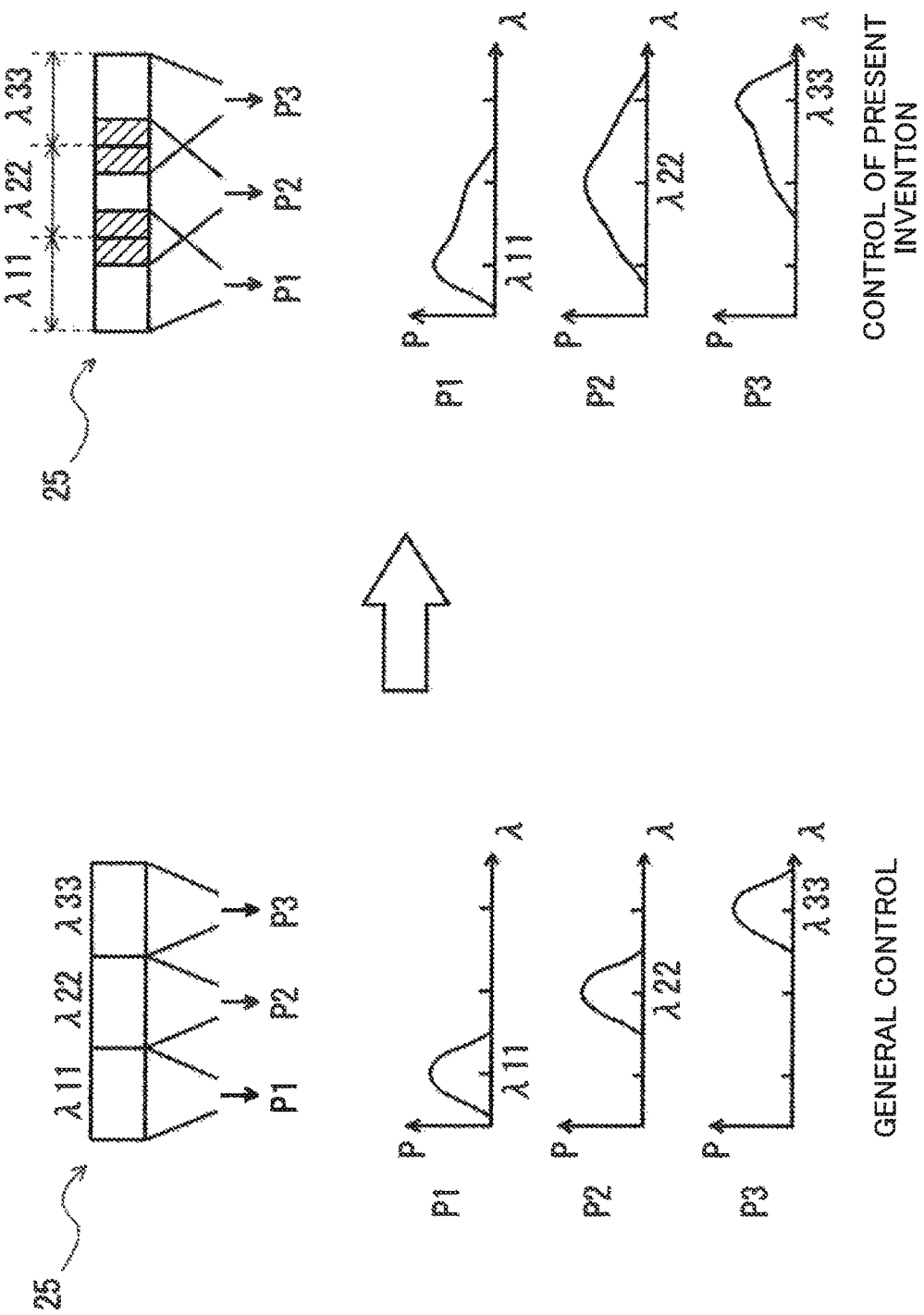
FIG. 4B is a diagram for a description of pass bands of the optical filters that the optical device according to the first example embodiment includes.

That is, as illustrated in the left drawing in FIG. 4B, in general control performed by a WSS, the switching element 25 in the wavelength selective switch WSS outputs the optical signals λ11, λ22, and λ33 with wavelengths different from one another to the ports P1, P2, and P3, respectively. On this occasion, the switching element 25 performs switching in such a way that the respective optical signals λ11, λ22, and λ33 do not overlap each other.

By contrast, in the optical device according to the present example embodiment, the switching element 25 in the wavelength selective switch WSS performs adjustment of pass bands using an LCOS element. The LCOS element of the switching element 25 is set to have pass bands that cause end portions of adjacent ones of the respective optical signals λ11, λ22, and λ33 to overlap each other, as illustrated in the right drawing in FIG. 4B.

That is, the switching element 25 in the wavelength selective switch WSS of the present example embodiment performs switching so that end portions of adjacent ones of the respective optical signals λ11, λ22, and λ33 overlap each other, as illustrated in the right drawing in FIG. 4B. When switching the respective optical signals λ11, λ22, and λ33 to the respective ports P1, P2, and P3, the switching element 25 in the wavelength selective switch WSS performs the switching causing end portions of adjacent ones of the respective optical signals λ11, λ22, and λ33 to overlap each other. Specifically, the switching element 25 performs the switching so that the optical signal λ11 and a portion of the optical signal λ11 are outputted to the ports P1 and P2, respectively.

In addition, the switching element 25 performs the switching so that a portion of the optical signal λ22, the optical signal λ22, another portion of the optical signal λ22 are outputted to the ports P1, P2, and P3, respectively. Still in addition, the switching element 25 performs the switching so that the optical signal λ33 and a portion of the optical signal λ33 are outputted to the ports P3 and P2, respectively. In the right drawing in FIG. 4B, portions to which the switching element 25 applies the overlap control of optical signals are indicated by hatching. In addition, power P of the respective optical signals λ11, λ22, and λ33 is illustrated in graphs in FIG. 4B. The control described above enables switching to be performed in such a way that end portions of adjacent ones of the optical signals λ11, λ22, and λ33 overlap each other. Note that, although, in FIG. 4B, a case where a wavelength selective switch WSS with one input and N outputs (1×N) was used was illustrated as an example, the present example embodiment may also be achieved using a wavelength selective switch WSS with N inputs and one output (N×1).

In addition, in the present example embodiment, overlapping areas may be set among the pass bands of respective optical signals by adjusting the shapes of input and output waveguides of an AWG. For example, overlapping areas may be set among the pass bands of respective optical signals by adjusting the shapes of a coupling portion between a slab waveguide and an input waveguide and a coupling portion between a slab waveguide and an output waveguide of an AWG.

The invention according to the present example embodiment, which has been described thus far, enables an optical device to be provided that is capable of suppressing an optical signal from being trimmed because of band narrowing due to optical filters.

Note that, although, in the above description, the optical device 1 (cyclic AWG) with three inputs and one output was described as an example, the present invention is not limited to the example, and the number of input ports and the number of output ports of the optical device 1 may be determined arbitrarily.

Second Example Embodiment

Next, a second example embodiment of the present invention will be described.

Figure 5:
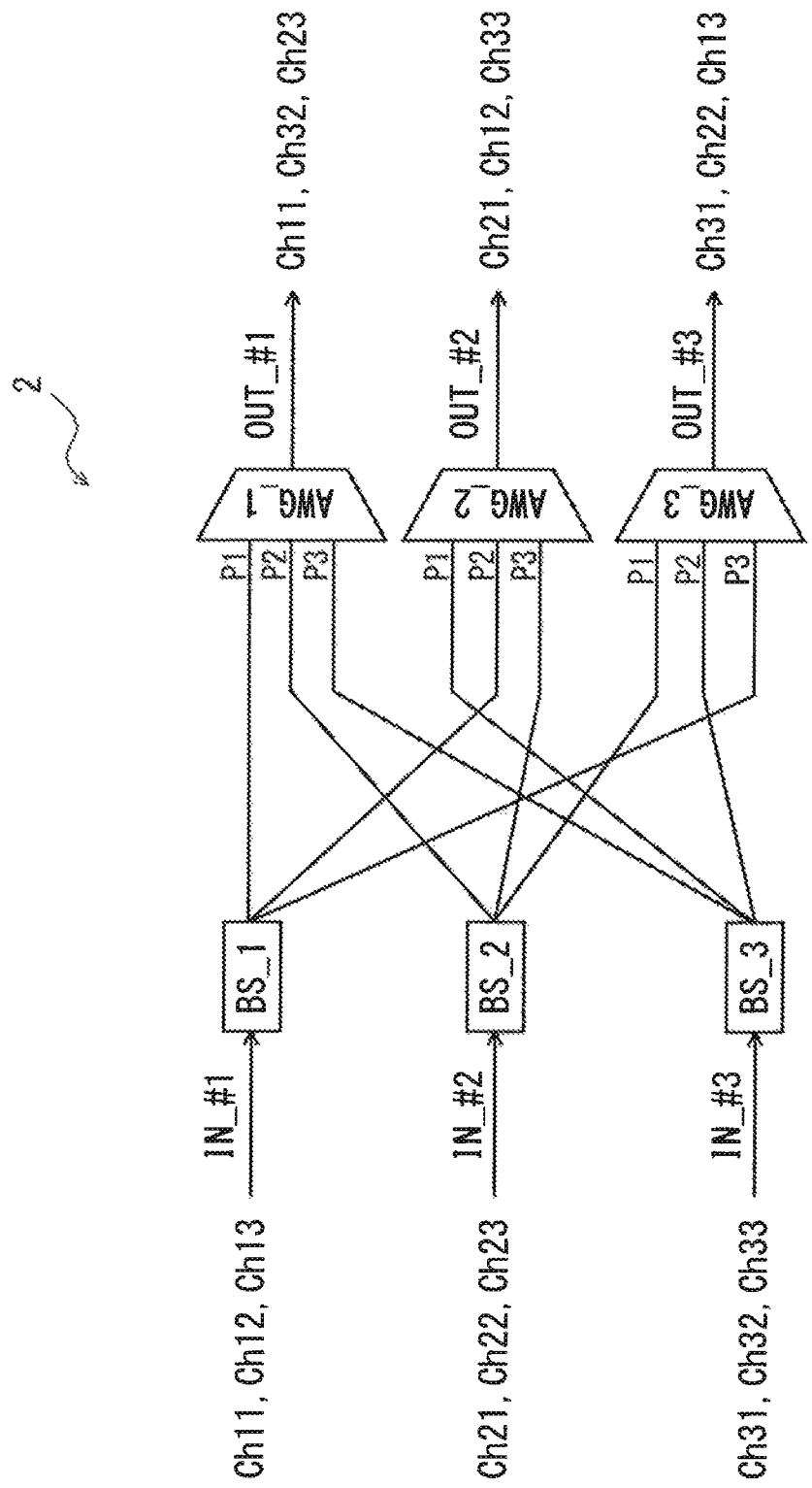
FIG. 5 is a diagram for a description of an optical device according to a second example embodiment.

FIG. 5 is a diagram for a description of an optical device 2 according to the second example embodiment. As illustrated in FIG. 5, the optical device 2 according to the present example embodiment is configured using a plurality of beam splitters BS_1 to BS_3 and a plurality of cyclic AWGs AWG_1 to AWG_3. The optical device 2 according to the present example embodiment may be used in an optical node, and more specifically an optical cross-connect node, in an optical communication network.

As illustrated in FIG. 5, the input sides of the beam splitters BS_1 to BS_3 are connected to three input side paths IN_#1 to IN_#3, respectively. Optical signals outputted from the beam splitters BS_1 to BS_3 are supplied to the cyclic AWGs AWG_1 to AWG_3, which are arranged at the succeeding stage of the beam splitters BS_1 to BS_3. Each of the beam splitters BS_1 to BS_3 is a beam splitter with one input and three outputs (1×3), and each of the cyclic AWGs AWG_1 to AWG_3 is a cyclic AWG with three inputs and one output (3×1). The output ports of the cyclic AWGs AWG_1 to AWG_3 are connected to output side paths OUT_#1 to OUT_#3, respectively.

Each of the beam splitters BS_1 to BS_3 outputs respective optical signals that are inputted to the beam splitter to an input port of each of the cyclic AWGs AWG_1 to AWG_3. Specifically, the beam splitter BS_1 supplies optical signals Ch11, Ch12, and Ch13 supplied from the input side path IN_#1 to an input port P1 of the cyclic AWG AWG_1, an input port P2 of the cyclic AWG AWG_2, and an input port P3 of the cyclic AWG AWG_3. Similarly, the beam splitter BS_2 supplies optical signals Ch21, Ch22, and Ch23 supplied from the input side path IN_#2 to an input port P2 of the cyclic AWG AWG_1, an input port P3 of the cyclic AWG AWG_2, and an input port P1 of the cyclic AWG AWG_3. Still similarly, the beam splitter BS_3 supplies optical signals Ch31, Ch32, and Ch33 supplied from the input side path IN_#3 to an input port P3 of the cyclic AWG AWG_1, an input port P1 of the cyclic AWG AWG_2, and an input port P2 of the cyclic AWG AWG_3.

Each of the cyclic AWGs AWG_1 to AWG_3 filters respective optical signals inputted to each of the input ports P1 to P3 of the cyclic AWG and outputs the filtered optical signals to the output side path connected thereto. Specifically, the cyclic AWG AWG_1 outputs the optical signals Ch11, Ch32, and Ch23 out of the optical signals inputted to the input ports P1 to P3 thereof to the output side path OUT_#1. In addition, the cyclic AWG AWG_2 outputs the optical signals Ch21, Ch12, and Ch33 out of the optical signals inputted to the input ports P1 to P3 thereof to the output side path OUT_#2. Still in addition, the cyclic AWG AWG_3 outputs the optical signals Ch31, Ch22, and Ch13 out of the optical signals inputted to the input ports P1 to P3 thereof to the output side path OUT_#3.

In the above configuration, the respective optical signals Ch11, Ch12, and Ch13, which pass through the input side path IN_#1, are optical signals in frequency bands different from one another. The same applies to the respective optical signals Ch21, Ch22, and Ch23, which pass through the input side path IN_#2, and the respective optical signals Ch31, Ch32, and Ch33, which pass through the input side path IN_#3.

Meanwhile, the optical signal Ch11 in the input side path IN_#1, the optical signal Ch21 in the input side path IN_#2, and the optical signal Ch31 in the input side path IN_#3 are optical signals in an identical frequency band. Similarly, the optical signal Ch12 in the input side path IN_#1, the optical signal Ch22 in the input side path IN_#2, and the optical signal Ch32 in the input side path IN_#3 are optical signals in an identical frequency band. Still similarly, the optical signal Ch13 in the input side path IN_#1, the optical signal Ch23 in the input side path IN_#2, and the optical signal Ch33 in the input side path IN_#3 are optical signals in an identical frequency band. For this reason, in order to achieve WDM communication, these optical signals are required to be set not to be outputted to an identical output side path.

In the optical device 2 according to the present example embodiment, the respective optical signals (Ch11, Ch12, Ch13, . . . , and Ch33) are routed in channel units. In addition, the respective optical signals are constituted so that a plurality of wavelength-multiplexed signals can be allocated within the band of one channel.

Figure 6:
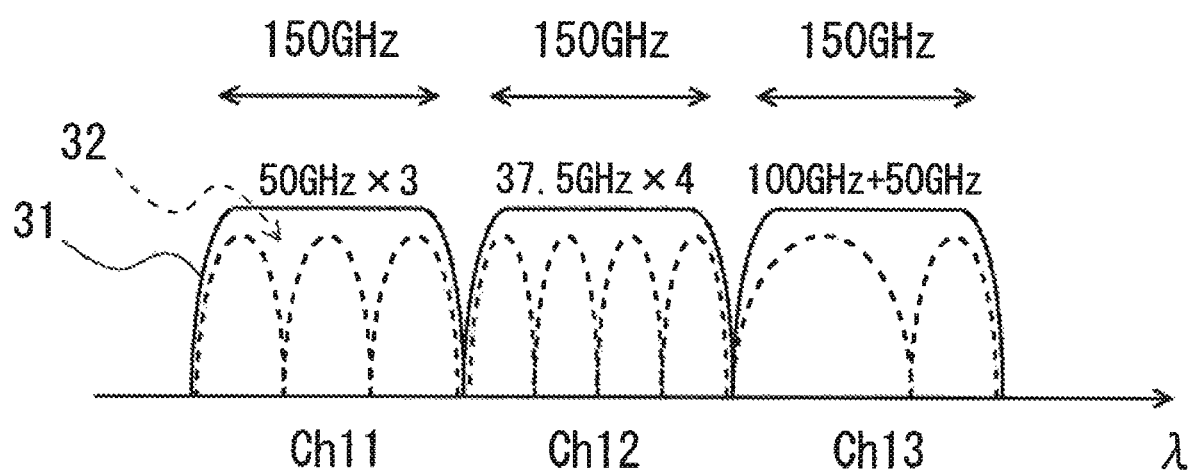
FIG. 6 is a diagram for a description of bandwidths of channels used by the optical device according to the second example embodiment.

FIG. 6 is a diagram for a description of channel bandwidths used by the optical device 2 according to the present example embodiment. As illustrated in FIG. 6, in the optical device 2 according to the present example embodiment, a plurality of wavelength-multiplexed signals (optical signals) 32 can be allocated within one channel band 31. In FIG. 6, a case where the bandwidths of the respective channels Ch11, Ch12, and Ch13 are set at 150 GHz and three optical signals with a bandwidth of 50 GHz are allocated in the channel Ch11 is illustrated as an example. In addition, a case where four optical signals with a bandwidth of 37.5 GHz are allocated in the channel Ch12 is illustrated. Still in addition, a case where an optical signal with a bandwidth of 100 GHz and an optical signal with a bandwidth of 50 GHz are allocated in the channel Ch13 is illustrated. Note that examples illustrated in FIG. 6 are just examples and the bandwidths of the respective channel bands 31 may be determined arbitrarily. Note also that the bandwidths and the number of optical signals 32 to be allocated in the band of each channel may be determined arbitrarily.

In the optical device 2 according to the present example embodiment, the pass-band width of each of the input ports P1 to P3 of each of the cyclic AWGs AWG_1 to AWG_3 (that is, the bandwidth of an optical filter) is set so as to correspond to the bandwidth of each of the channels (Ch11, Ch12, Ch13, . . . , and Ch33). In other words, expansion of the pass-band width of each of the input ports P1 to P3 of each of the cyclic AWGs AWG_1 to AWG_3 to the bandwidth of a channel enables optical signals each having a predetermined bandwidth (that is, the channels Ch11, Ch12, Ch13, . . . , and Ch33) to be respectively filtered. For example, filtering the channel Ch11 in channel units enables three optical signals 32 each of which has a bandwidth of 50 GHz to be filtered in an identical direction.

For example, the optical signals Ch11, Ch12, and Ch13, Ch21, Ch22, and Ch23, and Ch31, Ch32, and Ch33 are supplied to the input ports P1, P2, and P3 of the cyclic AWG AWG_1, respectively. On this occasion, setting the pass-band width of each of the input ports P1 to P3 at 150 GHz enables an optical signal with a bandwidth per channel of 150 GHz to be passed.

For example, making the pass band and the center frequency of the input port P1 of the cyclic AWG AWG_1 coincide with the frequency band and the center frequency of the optical signal Ch11, respectively, enables only the optical signal Ch11 out of the optical signals Ch11, Ch12, and Ch13 supplied to the input port P1 to be passed. That is, making the pass band of the input port P1, that is, the pass band and the center frequency of an optical filter, coincide with the frequency band and the center frequency of the optical signal Ch11, respectively, enables the optical signals Ch12 and Ch13 to be removed.

Similarly, making the pass band and the center frequency of the input port P2 of the cyclic AWG AWG_1 coincide with the frequency band and the center frequency of the optical signal Ch23, respectively, enables only the optical signal Ch23 out of the optical signals Ch21, Ch22, and Ch23 supplied to the input port P2 to be passed.

Still similarly, making the pass band and the center frequency of the input port P3 of the cyclic AWG AWG_1 coincide with the frequency band and the center frequency of the optical signal Ch32, respectively, enables only the optical signal Ch32 out of the optical signals Ch31, Ch32, and Ch33 supplied to the input port P3 to be passed.

For example, the pass-band width of each of the input ports P1 to P3 of each of the cyclic AWGs AWG_1 to AWG_3 may be set at m (m is a positive real number not less than 2) times of an adjacent frequency interval of a plurality of wavelength-multiplexed signals. For example, when it is assumed that the adjacent frequency interval of wavelength-multiplexed signals is 37.5 GHz and m=4, the pass-band width of each of the input ports P1 to P3 is 150 GHz (see Ch12 in FIG. 6). In this case, when it is assumed that communication with a capacity of 100 Gbps per optical signal is performed, it is possible to achieve communication with a capacity of 400 Gbps because four optical signals with a bandwidth of 37.5 GHz can be allocated within one channel.

In addition, when, for example, it is assumed that the adjacent frequency interval of wavelength-multiplexed signals is 50 GHz and m=3, the pass-band width of each of the input ports P1 to P3 is 150 GHz (see Ch11 in FIG. 6). In this case, when it is assumed that communication with a capacity of 100 Gbps per optical signal is performed, it is possible to achieve communication with a capacity of 300 Gbps because three optical signals with a bandwidth of 50 GHz can be allocated within one channel. Still in addition, when, for example, it is assumed that the adjacent frequency interval of wavelength-multiplexed signals is 75 GHz and m=2, the pass-band width of each of the input ports P1 to P3 is also 150 GHz. The above-described examples are just examples, and an optimal signal interval and an optimal additional bandwidth of an AWG (m times of the signal interval) are determined based on the modulation method and the capacity of involved signals.

As described above, the optical device 2 according to the present example embodiment is configured so that a plurality of wavelength-multiplexed signals can be allocated within the band of one channel. In the above configuration, the number and the bandwidths of a plurality of wavelength-multiplexed signals allocated in the band of one channel may be set arbitrarily.

That is, when only one optical signal is allocated to one channel, channels have a one-on-one correspondence with optical signals. For this reason, a relationship between each of optical signals supplied to the input side paths IN_#1 to IN_#3 and each of optical signals outputted from the output side paths OUT_#1 to OUT_#3 is determined uniquely. In other words, a relationship between each of optical signals supplied to the input side paths IN_#1 to IN_#3 and each of optical signals outputted from the output side paths OUT_#1 to OUT_#3 is fixed. Consequently, there has been a problem in that conventional optical devices are deficient in operational flexibility in an optical communication network.

By contrast, the optical device 2 according to the present example embodiment is configured so that a plurality of wavelength-multiplexed signals can be allocated within the band of one channel. Further, the pass-band width of each of the input ports (that is, the pass-band width of each of the optical filters corresponding to the respective input ports) of the cyclic AWG is expanded so that the cyclic AWG is able to filter optical signals in channel units. This configuration enables the number and the bandwidths of a plurality of wavelength-multiplexed signals allocated in each channel to be set arbitrarily, which enables optical signals that are to be transmitted to be set flexibly. That is, as illustrated in FIG. 6, the number of optical signals allocated within one channel can be varied (see the channels Ch11 and Ch12) and optical signals with bandwidths different from each other can be allocated within one channel (see the channel Ch13). For this reason, optical signals that are to be transmitted may be set flexibly.

In addition, in the optical device 2 according to the present example embodiment, the use of the cyclic AWGs AWG_1 to AWG_3 enables signals in an identical frequency band to be avoided from being outputted to an identical output side path.

By the way, in the optical device 2 according to the present example embodiment, a plurality of wavelength-multiplexed signals are allocated within the band of one channel. In order to transmit optical signals with high density (a high accommodation rate), it is preferable that, as illustrated in the upper drawing in FIG. 7, there be no difference between the bandwidth of a pass band 41 of an optical filter and a bandwidth of four optical signals 42 (that is, a bandwidth per channel). In the case illustrated in the upper drawing in FIG. 7, for example, since the bandwidth of one optical signal 42 is 37.5 GHz and the number of the optical signals 42 is four, the bandwidth of the four optical signals 42 (bandwidth per channel) becomes 37.5 GHz× 4=150 GHz. In this case, setting the bandwidth 41 of the optical filter at 150 GHz enables optical signals to be transmitted with high density.

However, since the shape of each optical filter is not rectangular and there is individual variation in the center frequency and the bandwidth of each optical filter, the bandwidth of filters viewed at the receiving end becomes narrower (band narrowing) as the number of filters increases. Such a characteristic of filters causes optical signals to be trimmed at both ends of the frequency band thereof and to lose some signal components therein during a transmission process, and, eventually, signal errors increase at the receiving end, which disables reception of the signals. Explaining specifically, as illustrated in the lower drawing in FIG. 7, when multiple stages of optical filters are concatenated, the bandwidth of the pass band 41 becomes narrower than the original bandwidth and comes to have a bandwidth indicated by a bandwidth 43. As a result, there occurs a case where, since signals at both ends out of four optical signals 42 are trimmed (portions that are trimmed off are indicated by hatching), the level of the signals at both ends is decreased to a level at which the signals cannot be received.

Setting gap areas (that is, guard bands) between optical signals and both ends of the optical filter band in order to suppress such a phenomenon is conceivable. In this case, however, there is a problem in that the accommodation rate of optical signals is reduced by as much as the width of the set guard bands.

In order to solve such a problem, in the optical device 2 according to the present example embodiment, the respective optical filters are configured in such a way that portions of the pass bands of respective optical filters that respectively pass optical signals in channels adjacent to each other overlap each other. Explaining specifically, the optical device 2 is configured in such a way that a portion of the pass band of the optical filter of the port P1 and a portion of the pass band of the optical filter of the port P2 of the cyclic AWG AWG_1 illustrated in FIG. 5 overlap each other as pass bands 51_1 and 51_2 illustrated in FIG. 8 do. That is, an overlapping area 55 is set between the pass bands of the optical filters of the ports P1 and P2 of the cyclic AWG AWG_1. In this configuration, the pass band of the optical filter of the port P1 of the cyclic AWG AWG_1 corresponds to the wavelength band of the channel Ch11. In addition, the pass band of the optical filter of the port P2 of the cyclic AWG AWG_1 corresponds to the wavelength band of the channel Ch32.

The pass band of each optical filter of the cyclic AWG may be made variable by, for example, adjusting the shapes of input and output waveguides of the cyclic AWG. Expanding pass bands corresponding to the respective optical filters enables pass bands to overlap each other between optical filters corresponding to adjacent ports. For example, the pass band corresponding to each port of the cyclic AWG can be expanded by adjusting the shapes of a coupling portion between an input waveguide and a slab waveguide on the input side of the cyclic AWG and a coupling portion between a slab waveguide on the output side and an output waveguide of the cyclic AWG.

Figure 8:
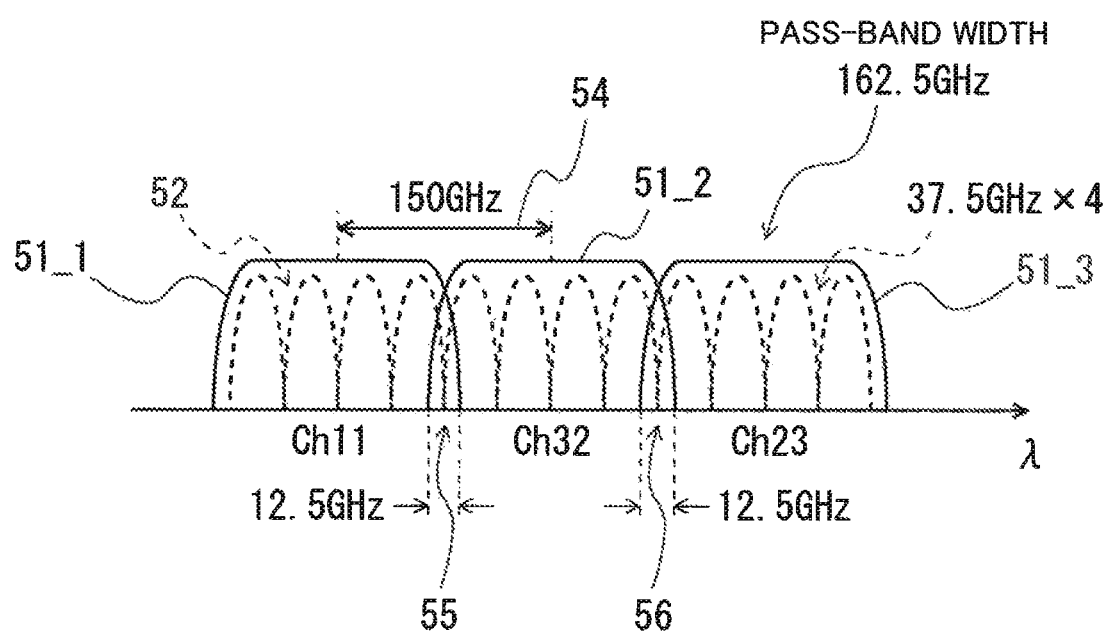
FIG. 8 is a diagram for a description of pass bands of a cyclic AWG that the optical device according to the second example embodiment includes.

In addition, the optical device 2 is configured in such a way that a portion of the pass band of the optical filter of the port P2 and a portion of the pass band of the optical filter of the port P3 of the cyclic AWG AWG_1 illustrated in FIG. 5 overlap each other as pass bands 51_2 and 51_3 illustrated in FIG. 8 do. That is, an overlapping area 56 is set between the pass bands of the optical filters of the ports P2 and P3 of the cyclic AWG AWG_1. In this configuration, the pass band of the optical filter of the port P2 of the cyclic AWG AWG_1 corresponds to the wavelength band of the channel Ch32. In addition, the pass band of the optical filter of the port P3 of the cyclic AWG AWG_1 corresponds to the wavelength band of the channel Ch23.

For example, expanding the pass bands of the respective optical filters while maintaining a frequency interval between respective optical filters corresponding to channels adjacent to each other enables portions of the pass bands of respective optical filters corresponding to channels adjacent to each other to overlap each other. Explaining by use of a specific example, as illustrated in FIG. 8, while a frequency interval 54 between adjacent ones of the respective channels is maintained at 150 GHz, the widths of the pass bands 51_1 to 51_3 of the respective optical filters corresponding to the respective channels are expanded from 150 GHz to 162.5 GHz.

Setting the frequency interval and the pass-band widths as described above enables a portion of the pass band 51_1 and a portion of the pass band 51_2 to overlap each other. In this case, the width of the overlapping area 55 where the pass band 51_1 and the pass band 51_2 overlap each other becomes 12.5 GHz. Similarly, setting the frequency interval and the pass-band widths as described above enables a portion of the pass band 51_2 and a portion of the pass band 51_3 to overlap each other. In this case, the width of the overlapping area 56 where the pass band 51_2 and the pass band 51_3 overlap each other also becomes 12.5 GHz.

As described above, in the optical device 2 according to the present example embodiment, the respective optical filters are configured in such a way that portions of the pass bands of respective optical filters that respectively pass optical signals in channels adjacent to each other overlap each other. Accordingly, optical signals may be suppressed from being trimmed at both ends of the frequency band thereof because of band narrowing on the optical signals during a transmission process of the optical signals and an optical signal that cannot be received may be suppressed from occurring. Therefore, transmission characteristics may be suppressed from deteriorating.

Meanwhile, making portions of pass bands overlap each other between adjacent channels causes an optical signal in one channel to leak into the other adjacent channel and crosstalk to occur. However, optimizing overlapping width between filters through a comparison between filter band narrowing and crosstalk so that deterioration of optical signals is minimized enables best transmission characteristics to be obtained.

Note that, as to the optical device 2 illustrated in FIG. 5, a case where both the number of input side paths and the number of output side paths were three was described as an example. However, in the optical device 2 according to the present example embodiment, the number of input side paths and the number of output side paths may be a number other than three. That is, in the case of a configuration including n input side paths IN_#1 to IN_#n and n output side paths OUT_#1 to OUT_#n, n beam splitters BS_1 to BS_n (each thereof is a beam splitter with one input and n outputs) that are connected to the input side paths IN_#1 to IN_#n, respectively, are arranged. In the above, n is a natural number not less than 2.

In addition, n cyclic AWGs AWG_1 to AWG_n (each thereof is a cyclic AWG with n inputs and one output) are arranged at the succeeding stage of the n beam splitters BS_1 to BS_n. Each of the n beam splitters BS_1 to BS_n outputs respective optical signals that are inputted to the beam splitter to an input port of each of the n cyclic AWGs AWG_1 to AWG_n. Each of the n cyclic AWGs AWG_1 to AWG_n filters respective optical signals inputted to each of the input ports of the cyclic AWG and outputs the filtered optical signals to the output side path connected thereto. This operation causes optical signals after routing to be outputted to the output side paths OUT_#1 to OUT_#n.

The invention according to the present example embodiment, which has been described thus far, enables an optical device to be provided that is capable of suppressing optical signals from being trimmed because of band narrowing due to optical filters.

The whole or part of the example embodiments disclosed above can be described as, but not limited to, the following supplementary notes.

(Supplementary Note 1)

An optical device comprising a plurality of optical filters each of which filters an optical signal in a predetermined band out of a plurality of optical signals with wavelengths different from one another, wherein the plurality of optical filters are configured in such a way that portions of pass bands of respective optical filters that respectively pass optical signals with wavelengths adjacent to each other overlap each other.

(Supplementary Note 2)

The optical device according to supplementary note 1, by expanding pass-band width of each of the plurality of optical filters while maintaining a frequency interval between optical filters adjacent to each other, making portions of pass bands of the respective optical filters adjacent to each other overlap each other.

(Supplementary Note 3)

The optical device according to supplementary note 1 or 2, wherein the plurality of optical filters are super-Gaussian type optical filters or optical filters each of which can be approximated with a super-Gaussian function.

(Supplementary Note 4)

The optical device according to any one of supplementary notes 1 to 3, wherein pass-band width per optical filter of the plurality of optical filter is a bandwidth that allows a plurality of optical signals to pass simultaneously.

(Supplementary Note 5)

The optical device according to any one of supplementary notes 1 to 4, wherein the optical device is a cyclic AWG that filters the respective optical signals, the respective optical signals are filtered in channel units, each of the channels is constituted so that a plurality of optical signals can be allocated within a band of the channel, and pass-band width per optical filter of the optical filters in the cyclic AWG corresponds to bandwidth of each of the channels.

(Supplementary Note 6)

The optical device according to supplementary note 5, wherein pass-band width per optical filter of the optical filters in the cyclic AWG is set at m (m is a positive real number not less than 2) times of an adjacent frequency interval of the plurality of optical signals.

(Supplementary Note 7)

The optical device according to supplementary note 6, wherein pass-band width of each of the optical filters in the cyclic AWG is 150 GHz, and a center frequency interval of the optical filters is 150 GHz.

(Supplementary Note 8)

The optical device according to supplementary note 7, wherein the adjacent frequency interval is 37.5 GHz, and a value of the m is 4.

(Supplementary Note 9)

The optical device according to supplementary note 7, wherein the adjacent frequency interval is 50 GHz, and a value of the m is 3.

(Supplementary Note 10)

The optical device according to supplementary note 7, wherein the adjacent frequency interval is 75 GHz, and a value of the m is 2.

(Supplementary Note 11)

The optical device according to any one of supplementary notes 1 to 3, wherein the optical device is a wavelength selective switch that is capable of varying a pass band.

(Supplementary Note 12)

The optical device according to any one of supplementary notes 1 to 3, wherein the optical device is an AWG.

(Supplementary Note 13)

A processing method of optical signals comprising:

inputting wavelength-multiplexed optical signals to a plurality of optical filters where portions of pass bands that respectively pass optical signals with wavelengths adjacent to each other overlap each other; and filtering an optical signal in a predetermined band out of a plurality of the optical signals with wavelengths different from one another.

(Supplementary Note 14)

The processing method of optical signals according to supplementary note 13 comprising by expanding pass-band width of each of the plurality of optical filters while maintaining a frequency interval between the optical filters adjacent to each other, making portions of pass bands of the respective optical filters adjacent to each other overlap each other.

(Supplementary Note 15)

The processing method of optical signals according to supplementary note 13 or 14, wherein pass-band width per optical filter of the plurality of optical filter is a bandwidth that allows a plurality of optical signals to pass simultaneously.

(Supplementary Note 16)

The processing method of optical signals according to supplementary notes 13 to 15, wherein each of the optical filters is set in such a way that pass-band width when the respective optical signals are filtered corresponds to bandwidth of a channel where a plurality of optical signals are allocated within a band of the channel and filters the respective optical signals in units of the channel.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-38163, filed on Feb. 29, 2016, the disclosure of which is incorporated herein in its entirety by reference.

REFERENCE SIGNS LIST 1, 2 Optical device
11_1 to 11_3 Optical filter
12 Multiplexing unit
13_1 to 13_3 Pass band
15_1 to 15_3 Optical signal
17, 18 Overlapping area
21_1 to 21_3 Pass band
22_1 to 22_3 Bandwidth
31 Pass band
32 Optical signal
41 Pass band
42 Optical signal
43 Bandwidth
51_1 to 51_3 Pass band
52 Optical signal
54 Frequency interval
55, 56 Overlapping area

The invention claimed is:

1. An optical device comprising a first optical filter configured to pass first optical signals from a first multiplexed signal, the first optical signals comprising a first optical channel;

a second optical filter configured to pass second optical signals from a second multiplexed signal, the second optical signals comprising a second optical channel; and a multiplexer configured to multiplex the past first optical signals and the past second optical signals, wherein the first optical filter comprises a first pass band and the second optical filter comprises a second pass band, the first pass band and the second pass band overlapping each other.

2. The optical device according to claim 1, by expanding pass-band width of each of the first optical filter and the second optical filter while maintaining a frequency interval between optical filters adjacent to each other, making portions of pass bands of the respective optical filters adjacent to each other overlap each other.

3. The optical device according to claim 1, wherein the first optical filter and the second optical filter are super-Gaussian type optical filters or optical filters each of which can be approximated with a super-Gaussian function.

4. The optical device according to claim 1, wherein each pass-band width of the first optical filter and the second optical filter is a bandwidth that allows a plurality of optical signals to pass simultaneously.

5. The optical device according to claim 1, wherein the optical device is a cyclic AWG that filters the respective optical signals, the respective optical signals are filtered in channel units, each of the channels is constituted so that a plurality of optical signals can be allocated within a band of the channel, and each pass-band width of the first optical filter and the second optical filter in the cyclic AWG corresponds to bandwidth of each of the channels.

6. The optical device according to claim 5, wherein each pass-band width of the first optical filter and the second optical filter in the cyclic AWG is set at m (m is a positive real number not less than 2) times of an adjacent frequency interval of the plurality of optical signals.

7. The optical device according to claim 6, wherein
each pass-band width of the first optical filter and the second optical filter in the cyclic AWG is 150 GHz, and a center frequency interval of the optical filters is 150 GHz.

8. The optical device according to claim 7, wherein
the adjacent frequency interval is 37.5 GHz, and a value of the m is 4.

9. The optical device according to claim 7, wherein
the adjacent frequency interval is 50 GHz, and a value of the m is 3.

10. The optical device according to claim 7, wherein
the adjacent frequency interval is 75 GHz, and a value of the m is 2.

11. The optical device according to claim 1, wherein
the optical device is a wavelength selective switch that is capable of varying a pass band.

12. The optical device according to claim 1, wherein
the optical device is an AWG.

13. A processing method of optical signals comprising:
inputting a first multiplexed signal to a first optical filter with a first pass band;
passing first optical signals from the first multiplexed signal, the first optical signals comprising a first optical channel;
inputting a second multiplexed signal to a second optical filter with a second pass band, the first pass band and the second pass band overlapping each other;
passing second optical signals from the second multiplexed signal, the second optical signals comprising a second optical channel; and
multiplexing the past first optical signals and the past second optical signals.

14. The processing method of optical signals according to claim 13 comprising
by expanding pass-band width of each of the first optical filter and the second optical filter while maintaining a frequency interval between the optical filters adjacent to each other, making portions of pass bands of the respective optical filters adjacent to each other overlap each other.

15. The processing method of optical signals according to claim 13, wherein
each pass-band width of the first optical filter and the second optical filter is a bandwidth that allows a plurality of optical signals to pass simultaneously.

16. The processing method of optical signals according to claim 13, wherein
each of the first optical filter and the second optical filter is set in such a way that pass-band width when the respective optical signals are filtered corresponds to bandwidth of a channel where a plurality of optical signals are allocated within a band of the channel and filters the respective optical signals in units of the channel.

* * * * *